United States Patent
Jonsson

(10) Patent No.: US 11,175,164 B2
(45) Date of Patent: Nov. 16, 2021

(54) FUNCTIONAL STATE TRANSITION OF A SENSOR DEVICE BASED ON A LIGHT SIGNAL

(71) Applicant: ASSA ABLOY AB, Stockholm (SE)

(72) Inventor: Tomas Jonsson, Rönninge (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 16/960,288

(22) PCT Filed: Dec. 18, 2018

(86) PCT No.: PCT/EP2018/085596
§ 371 (c)(1),
(2) Date: Jul. 6, 2020

(87) PCT Pub. No.: WO2019/141467
PCT Pub. Date: Jul. 25, 2019

(65) Prior Publication Data
US 2020/0370934 A1 Nov. 26, 2020

(30) Foreign Application Priority Data

Jan. 22, 2018 (EP) .................................. 18152769

(51) Int. Cl.
*G08B 13/14* (2006.01)
*G01D 21/02* (2006.01)
(Continued)

(52) U.S. Cl.
CPC .............. *G01D 21/02* (2013.01); *H04W 4/80* (2018.02); *H04W 84/18* (2013.01); *H05B 47/105* (2020.01); *H05B 47/195* (2020.01)

(58) Field of Classification Search
CPC ......... G01D 21/02; G01D 21/00; H04W 4/80; H04W 84/18; H05B 47/195; H05B 47/105
(Continued)

(56) References Cited

U.S. PATENT DOCUMENTS

| 2011/0064026 A1 | 3/2011 | Niedermeier et al. |
| 2011/0080100 A1 | 4/2011 | Lemmers |

(Continued)

FOREIGN PATENT DOCUMENTS

| CN | 102047761 | 5/2011 |
| CN | 104363382 | 2/2015 |

(Continued)

OTHER PUBLICATIONS

Extended Search Report for European Patent Application No. 18152769.8, dated Jul. 6, 2018, 7 pages.

(Continued)

*Primary Examiner* — Tai T Nguyen
(74) *Attorney, Agent, or Firm* — Sheridan Ross P.C.

(57) ABSTRACT

It is presented a sensor device comprising: an environment sensor; a processor; a light sensor; a light source; a wireless communication module; and a memory. When the light sensor receives a light signal, the sensor device is configured to transition from a first functional state, in which wireless communication is inactivated, to a second functional state, in which wireless communication module is enabled. The memory stores instructions that, when executed by the processor, cause the sensor device to modulate light from the light source to transmit an identifier of the sensor device.

13 Claims, 2 Drawing Sheets

(51) Int. Cl.
*H04W 4/80* (2018.01)
*H05B 47/195* (2020.01)
*H05B 47/105* (2020.01)
*H04W 84/18* (2009.01)

(58) Field of Classification Search
USPC ............ 340/572.1, 572.7, 517, 521, 539.19, 340/539.22, 540, 541, 555
See application file for complete search history.

(56) References Cited

U.S. PATENT DOCUMENTS

| | | | |
|---|---|---|---|
| 2011/0312286 A1* | 12/2011 | Lin | H04W 52/0254 455/73 |
| 2014/0239817 A1* | 8/2014 | Leinen | H05B 47/10 315/152 |
| 2016/0202116 A1 | 7/2016 | Haensgen et al. | |
| 2017/0160111 A1 | 6/2017 | Dowdall et al. | |
| 2017/0245346 A1* | 8/2017 | Betourney | H04B 1/38 |
| 2017/0295545 A1 | 10/2017 | Zacchio et al. | |
| 2017/0352207 A1 | 12/2017 | Siklosi | |

FOREIGN PATENT DOCUMENTS

| | | |
|---|---|---|
| CN | 105187732 | 12/2015 |
| CN | 107004317 | 8/2017 |
| CN | 107079400 | 8/2017 |

OTHER PUBLICATIONS

International Search Report and Written Opinion for International (PCT) Patent Application No. PCT/EP2018/085596, dated Mar. 14, 2019, 13 pages.

Official Action with English Translation for China Patent Application No. 201880086655.1, dated Aug. 25, 2021, 19 pages.

* cited by examiner

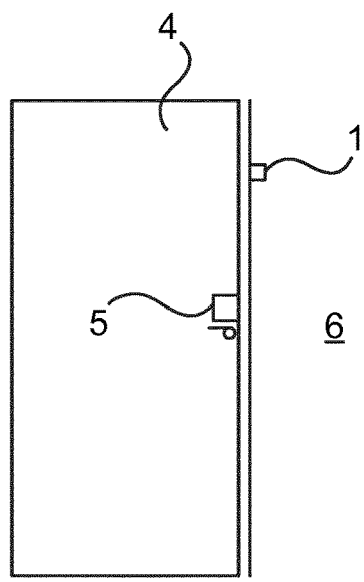
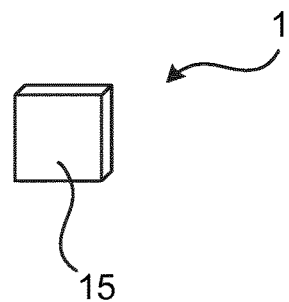
Fig. 1    Fig. 2
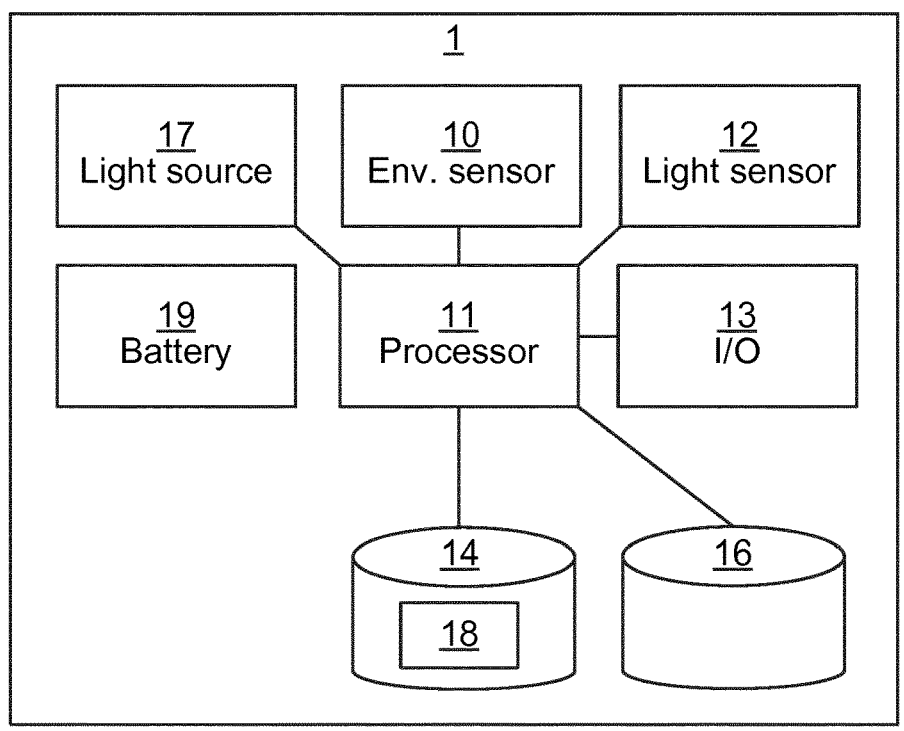
Fig. 3

FUNCTIONAL STATE TRANSITION OF A SENSOR DEVICE BASED ON A LIGHT SIGNAL

CROSS REFERENCE TO RELATED APPLICATIONS

This application is a national stage application under 35 U.S.C. 371 and claims the benefit of PCT Application No. PCT/EP2018/085596 having an international filing date of Dec. 18, 2018, which designated the U.S., which PCT application claimed the benefit of Europe Patent Application No. 18152769.8 filed Jan. 22, 2018, the disclosure of each of which are incorporated herein by reference.

TECHNICAL FIELD

The invention relates to a sensor device, a method, a computer program and a computer program product for transitioning a sensor device between functional states based on light.

BACKGROUND

Sensors devices are self contained devices containing one or more sensors, processor, memory, power and wireless communication capabilities. These sensor devices have drastically reduced in size recently and are increasing in popularity for a variety of different uses. For instance, sensor devices can use an included proximity sensor to detect whether a barrier, such as a door or window, is open or closed.

Once the sensor device is manufactured, it is in a transportation state, in which all, or almost all, components are shut off. In this way, the sensor device can remain in transportation state and preserve power until the sensor device is installed. At installation, the sensor device needs to transition from its transportation state and power up the components of the sensor device to allow configuration and normal operation.

US 2017/0245346 A1 discloses a system and method for light-based activation of an occupancy sensor wireless transceiver.

One known solution to achieve this transition is to have a reset button, which can be accessed through a hole in the casing, e.g. using a paper clip. However, it is preferable not to need a physical user input device which requires a perforation in the housing and/or inconvenient operation.

SUMMARY

It is an object to provide a way to alter a functional state of a sensor device which results in a sensor device which is more durable and reliable.

According to a first aspect, it is presented a sensor device comprising: an environment sensor; a processor; a light sensor; a light source; a wireless communication module; and a memory. When the light sensor receives a light signal, the sensor device is configured to transition from a first functional state, in which wireless communication is inactivated, to a second functional state, in which wireless communication module is enabled. The memory stores instructions that, when executed by the processor, cause the sensor device to modulate light from the light source to transmit an identifier of the sensor device.

The light signal may be a predetermined sequence of light pulses.

The memory may store instructions that, when executed by the processor, cause the sensor device to, when in the second functional state, receive configuration commands via the wireless communication module.

The memory may store instructions that, when executed by the processor, cause the sensor device to provide feedback on functional state transition using the light source.

The memory may store instructions that, when executed by the processor, cause the sensor device to modulate light from the light source to thereby enable the transmission of different messages.

The sensor device may comprise a housing that completely encloses the sensor device.

The first functional state may be a transportation state and the second functional state may be a configuration state.

The environment sensor may be a proximity sensor.

According to a second aspect, it is presented a method for transitioning between functional states of a sensor device, the method being performed in the sensor device, comprising an environment sensor, a light sensor, a light source and a wireless communication module. The method comprises the steps of: receiving a light signal; performing, based on receiving the light signal, a transition from a first functional state, in which wireless communication is inactivated, to a second functional state, in which wireless communication module is enabled; and modulating light from the light source to transmit an identifier of the sensor device.

The light signal may be a predetermined sequence of light pulses.

The method may further comprise the step of: receiving, when in the second functional state, configuration commands via the wireless communication module.

The method may further comprise the step of: providing feedback on functional state transition using a light source forming part of the sensor device.

According to a third aspect, it is presented a computer program for transitioning between functional states of a sensor device. The computer program comprises computer program code which, when run on a sensor device, comprising an environment sensor, a light sensor, a light source and a wireless communication module causes the sensor device to: receive a light signal; perform, based on receiving the light signal, a transition from a first functional state, in which wireless communication is inactivated, to a second functional state, in which wireless communication module is enabled; and modulate light from the light source to transmit an identifier of the sensor device.

According to a fourth aspect, it is presented a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 1 is a schematic diagram illustrating an environment in which embodiments presented herein can be applied;

FIG. 2 is a schematic diagram illustrating the sensor device of FIG. 1, where the housing of the sensor device is illustrated;

FIG. 3 is a schematic diagram illustrating components of the sensor device of FIG. 1 and FIG. 2 according to one embodiment;

DETAILED DESCRIPTION

Figure 4:
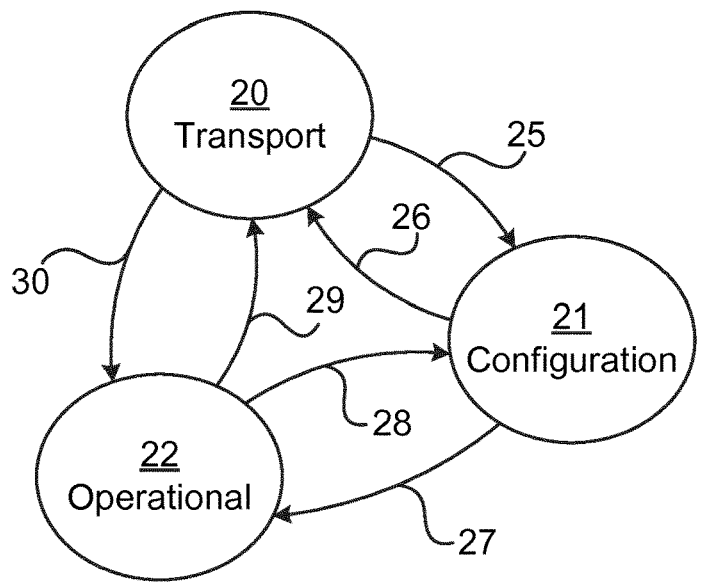
FIG. 4 is a state diagram illustrating functional states of the sensor device of FIGS. 1-3.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein are based on the realisation that state transitions for sensor devices can be achieved using light. By providing the sensor device with a light sensor, the sensor device can be controlled by external light, e.g. for assuming a configuration mode. The light sensor is provided inside an enclosure of the housing of the sensor device, whereby an all-encompassing housing can be provided while still allowing external control of the sensor device to control its functional state.

FIG. 1 is a schematic diagram illustrating an environment in which embodiments presented herein can be applied.

A barrier 4, which can be e.g. be a window, door, cabinet front, drawer, gate, etc., can be manipulated to be in either an open state or a closed state. Optionally, the ability to open the barrier 4 is selectively controlled using a lock 5. An opposing structure 6 is provided to allow the barrier 5 to be kept in a closed state. In, or attached to, the opposing structure 6, one or more sensor devices 1 are provided. The, or each, sensor device 1 comprises one or more environment sensors, e.g. to detect the presence of the barrier 4, to thereby determine whether the barrier 4 is open or closed.

FIG. 2 is a schematic diagram illustrating the sensor device of FIG. 1 where the housing of the sensor device is seen.

The sensor device 1 can be made very small, about 10 mm×10 mm×3 mm. Other sizes are also possible. The sensor device 1 contains all components (see FIG. 3 and text below) inside its housing 15. The housing 15 is sufficiently light permeable for light to pass through the housing 15 to reach a light sensor provided on the inside of the housing. The housing 15 can be transparent but could also be semitransparent. In embodiments presented herein, light is used to control the functional state of the sensor device. In this way, the housing can be provided such that it completely encloses the sensor device 1. Hence, there are no perforations in the enclosure, e.g. for components such as buttons, etc. as is provided in the prior art. The 3o completely enclosing housing 15 provides excellent durability and reliability since the housing protects both from physical damage and from environmental issues such as water, etc.

FIG. 3 is a schematic diagram illustrating components of the sensor device of FIG. 1 and FIG. 2 according to one embodiment. A processor 11 is provided using any combination of one or more of a suitable central processing unit (CPU), multiprocessor, microcontroller, digital signal processor (DSP), capable of executing software instructions 18 stored in a memory 14, which can thus be a computer program product. The processor 11 could alternatively be implemented using an application specific integrated circuit (ASIC), field programmable gate array (FPGA), etc. The processor 11 can be configured to execute the method described with reference to FIG. 5 below.

The memory 14 can be any combination of random access memory (RAM) and/or read only memory (ROM). The memory 14 also comprises persistent storage, which, for example, can be any single one or combination of solid-state memory, magnetic memory, and optical memory.

A data memory 16 is also provided for reading and/or storing data during execution of software instructions in the processor 11. The data memory 16 can be any combination of RAM and/or ROM.

The sensor device 1 further comprises wireless communication module 13 for wireless radio communication with other external entities. The wireless communication module 13 can support any suitable wireless protocol, e.g. Bluetooth or Bluetooth Low Energy (BLE), ZigBee, any of the IEEE 802.11x standards (also known as WiFi), etc.

One or more environment sensor 10 can be used to gain information about the environment of the sensor device 1. For instance, the environment sensor 10 can be a proximity sensor, which can detect the presence of an object in the vicinity of the sensor device 1. Optionally, the proximity sensor 10 is based on inductive sensing, whereby the presence of metal is detected. Alternatively or additionally, the proximity sensor is based on magnetic field detection.

A light sensor 12 is configured to detect light. The detected light can be used to change the functional state of the sensor device. The light sensor 12 can be made to operate on extremely low power in a transport state, at which point some or all of other components of the sensor device can be in a sleep state. Only when a particular light signal (which can be a predetermined sequence of light pulses) is detected, does the light sensor 12 provide a wakeup signal to components of the sensor device which are in a sleep state, e.g. by sending a wakeup signal to such components. This can cause the sensor device 1 to alter its functional state, e.g. to a configuration state or operational state (see FIG. 4).

Optionally, the sensor device 1 also comprises a light source 17. The light source 17 is any suitable light source and can e.g. be a Light Emitting Diode (LED) which is very energy efficient. The light source 17 can be used as output (to a user or to an external device) to provide feedback to a user interacting with the sensor device 1.

The sensor device 1 further comprises a battery 19 which is also enclosed by the housing. The battery 19 powers all electric and electronic components of the sensor device 1. Due to the low power consumption of the sensor device 1, the battery 19 can power the sensor device 1 for a very long time, in the order of years. Hence, the battery can be a single use battery, which is not neither exchangeable nor chargeable. Since the type of battery is known from production, battery status determination (e.g. charge level) can be performed in a reliable manner.

Other components of the sensor device 1 are omitted in order not to obscure the concepts presented herein.

FIG. 4 is a state diagram illustrating functional states of the sensor device 1 of FIGS. 1-3. In FIG. 4, there are three functional states 20, 21, 22 shown. Each functional state differs from other functional states in the type of functionality that is provided by the sensor device. There can be more or fewer functional states, as long as there is at least a transport state and another state.

In a transport state 20, the sensor device is completely inactive to prevent any radio transmissions and to save power. The only component which needs to be responsive is the light sensor.

In a configuration state 21, the sensor device can be paired with another device, e.g. using BLE. A system interface can be available for configuration of the sensor device and information gathering for troubleshooting, such as checking a communication link with a gateway, etc. In the configuration state 21, the sensor device can be configured using wireless communication e.g. over BLE. For instance, a smartphone, tablet computer, laptop computer or desktop computer can be used to send configuration commands to the sensor device over the wireless interface.

In an operational state 22, the sensor device is in a normal operational state and communicates and senses its environment according to its programmed and configured function.

When in the transport state 20, the sensor device can transition 25 to the configuration state 21 when a light is provided on the sensor device. The sensor device can also be made to transition 30 from the transport state 20 to the operational state 22 using a light from an external device.

When in the configuration state 21, the sensor device can transition 26 to the transport state 20 by receiving an appropriate command from an external device. Since the wireless interface is available in the configuration state 21, the command can be sent either using light signals or using the wireless interface. Similarly, a command can be transmitted to the sensor device, causing the sensor device to transition 27 from the configuration state 21 to the operational state. It is to be noted that also when in the configuration state 21, the transition to the transport state 20 or the operational state 22 could alternatively or additionally also be triggered using light.

When in the operational state 22, the sensor device can transition 29 to the transport state 20 by receiving an appropriate command from an external device. Since the wireless interface is available in the operational state 22, the command can be sent either using light signals or using the wireless interface. Similarly, a command can be transmitted to the sensor device, causing the sensor device to transition 28 from the operational state 22 to the configuration state 21. It is to be noted that also when in the operational state 21, the transition to the transport state 20 or the configuration state 21 could alternatively or additionally be triggered using light.

It is to be noted that all transitions mentioned here do not need to be implemented, as long as there the transition 25 from the transport state to the configuration state 21, and the transition 27 from the configuration state 21 to the operational state 22 are implemented.

Figure 5:
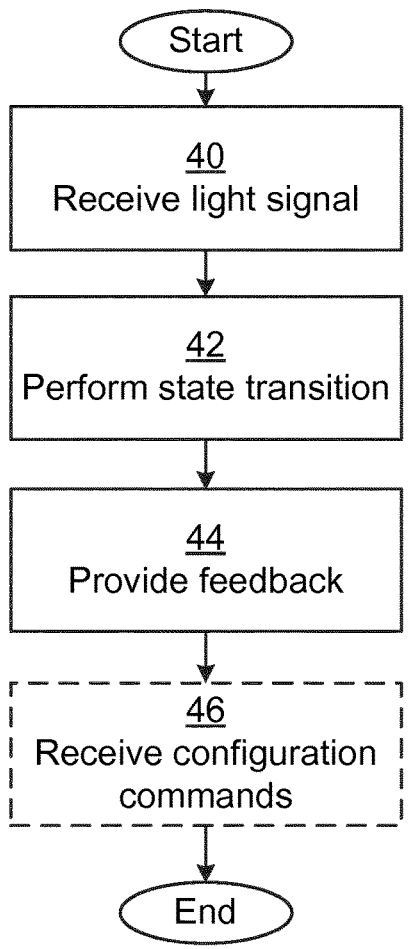
FIG. 5 is a flow chart illustrating embodiments of methods for transitioning between functional states of a sensor device.

FIG. 5 is a flow chart illustrating embodiments of methods for transitioning between functional states of a sensor device, e.g. the sensor device of FIGS. 1-3 described above. The sensor device comprises at least one environment sensor (such as a proximity sensor), a light sensor and a wireless communication module.

In a receive light signal step 40, the sensor device receives a light signal. The light signal can be a predetermined sequence of light pulses to prevent state transition by light from cars, sunlight, etc.

The identity of the sensor device can be provided with a printed optical code, e.g. barcode or 2D code, on its exterior. The printed code can be scanned at installation, e.g. using a camera of a smartphone. At that time, it is very convenient to use the flash of the smartphone camera to shine light on the sensor device to thereby change the state of the sensor device from transport to configuration. In this way, by simply scanning the optical code of the sensor device at installation, which is performed anyway when the optical code is provided, the functional state of the sensor device is also updated 3*o* without requiring any physical interaction with the sensor device.

Alternatively, the identity can be provided in an optional provide feedback step 44 as explained below.

In a perform state transition step 42, the sensor device performs, based on receiving the light signal, a transition from a first functional state to a second functional state. In the first functional state, as explained above, wireless communication is inactivated. In the second functional state, wireless communication module is enabled. The first functional state can be the transport state and the second functional state can be the configuration state or the operational state. The transition can involve sending a wakeup signal to wake up one or more components of the sensor device from a sleep state.

In a provide feedback step 44, the sensor device provides feedback on functional state transition using the light source forming part of the sensor device. The light from the light source can be modulated (e.g. in different patterns of light on/light off) to thereby enable the transmission of different messages. Optionally, different colours of the light source are used to indicate different message. The modulation can be used to transmit an identifier of the sensor device.

One type of feedback that can be provided using the light source is an indication of a normal state or when there is an issue with the sensor device, i.e. an error code. The light source can use different colours and/or blinking patterns to provide different messages.

Depending on the modulation, it can be detected by a human or an external device (being external to the sensor device). When a human is to be able to interpret the modulation, the message detection is easier since an external device does not need to interpret the feedback, but a human is not able to distinguish between many different modulations. When an external device, such as a smartphone, is to be able to interpret the modulation, the external device can use a camera and logic to decode interpretations of much greater complexity. This allows the sensor device to send a lot of information to the external device, and thus to a user, allowing full input/output using only light.

Examples of messages that can be communicated using the light source are "I am alive", "I am in state X", "my BLE interface is active". The light source can thus be used to detect when BLE is not enabled on an external device, which is a common situation.

Optionally, the light source is used to transmit a modulated signal containing the identifier of the sensor. The camera of the external device can then demodulate the light source to obtain the identifier. In this way, the sensor does not need to have any optical code with its identifier printed on it. While it is a simple solution to provide the optical code printed and affixed to the sensor device, this solution also has some issues. The optical code can get damaged or worn over time or the user may want to remove it for aesthetic reasons after installation. Also, the optical code is quite large, whereby it might be too large to be able to fit on the sensor device when this is small. In the prior art, if the optical code is removed, the sensor cannot be paired again.

When the identifier is transmitted using the light source, there is no need for an optical code and these issues are no longer present. Furthermore, when the sensor is integrated into a larger structure, such as a lock or handle in a factory, it is of great benefit not to need to provide the optical code.

The modulated light signal is limited in its reach and is thus more difficult to eavesdrop, increasing security. For instance, encryption keys can be transmitted to an external device using the modulated light.

Also, when the identifier is transmitted using the light source, the mechanical installation can be performed by one person and the electronic installation can be performed by a second person. By transmitting the identifier using light, the identifier is not sent over radio, reducing the risk of eavesdropping by an attacker and reducing ambiguity with regard to which sensor is transmitting the identifier.

When the external device has obtained the identifier, the identifier can be used to establish a wireless connection with the sensor device, e.g. by pairing with the sensor device.

In an optional receive configuration commands step 46, the sensor device receives configuration commands via the wireless communication module.

This step is only performed when the sensor device is in the second functional state.

Using the sensor device according to embodiments presented herein, the functional state of the sensor device can be altered using light signals.

This can be exploited in a complex supply chain scenario. For instance, the sensor device can be received at the manufacturer of a barrier. The manufacturer mounts the sensor device in the barrier structure, after which the barrier is held in stock. The barrier is then supplied to an installation site and the barrier is installed. After installation, the sensor device can be set in the installed state. At some or all points in this scenario, a light signal can optionally be used to set a date of the activity. Optionally, the sensor device can detect on its own when it is transported or in stock.

Figure 6:
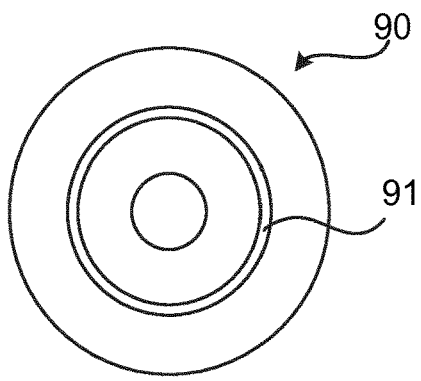
FIG. 6 shows one example of a computer program product comprising computer readable means.

FIG. 6 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 14 of FIG. 3. While the computer program 91 is here schematically shown as a track on the depicted optical disk, the computer program can be stored in any way which is suitable for the computer program product, such as a removable solid state memory, e.g. a Universal Serial Bus (USB) drive.

Here now follows a list of embodiments from another perspective, enumerated with roman numerals.

i. A sensor device comprising:
   an environment sensor;
   a processor;
   a light sensor;
   a wireless communication module; and
   a memory;
   wherein when the light sensor receives a light signal, the sensor device is configured to transition from a first functional state, in which wireless communication is inactivated, to a second functional state, in which wireless communication module is enabled.

ii. The sensor device according to embodiment i, wherein the light signal is a predetermined sequence of light pulses.

iii. The sensor device according to embodiment i or ii, wherein the memory stores instructions that, when executed by the processor, cause the sensor device to, when in the second functional state, receive configuration commands via the wireless communication module.

iv. The sensor device according to any one of the preceding embodiments, further comprising a light source, wherein the memory stores instructions that, when executed by the processor, cause the sensor device to provide feedback on functional state transition using the light source.

v. The sensor device according to embodiment iv, wherein the memory stores instructions that, when executed by the processor, cause the sensor device to modulate light from the light source to thereby enable the transmission of different messages.

vi. The sensor device according to embodiment v, wherein the memory stores instructions that, when executed by the processor, cause the sensor device to use the light source to transmit an identifier of the sensor device.

vii. The sensor device according to any one of the preceding embodiments, wherein the sensor device comprises a housing that completely encloses the sensor device.

viii. The sensor device according to any one of the preceding embodiments, wherein the first functional state is a transportation state and the second functional state is a configuration state.

ix. The sensor device according to any one of the preceding embodiments, wherein the environment sensor is a proximity sensor.

x. A method for transitioning between functional states of a sensor device, the method being performed in the sensor device, comprising an environment sensor, a light sensor and a wireless communication module, the method comprising the steps of:
   receiving a light signal; and
   performing, based on receiving the light signal, a transition from a first functional state, in which wireless communication is inactivated, to a second functional state, in which wireless communication module is enabled.

xi. The method according to embodiment x, wherein the light signal is a predetermined sequence of light pulses.

xii. The method according to embodiment x or xi, further comprising the step of:
   receiving, when in the second functional state, configuration commands via the wireless communication module.

xiii. The method according to any one of embodiments x to xii, further comprising the step of:
   providing feedback on functional state transition using a light source forming part of the sensor device.

xiv. A computer program for transitioning between functional states of a sensor device, the computer program comprising computer program code which, when run on a sensor device, comprising an environment sensor, a light sensor and a wireless communication module causes the sensor device to:
   receive a light signal; and
   perform, based on receiving the light signal, a transition from a first functional state, in which wireless communication is inactivated, to a second functional state, in which wireless communication module is enabled.

xv. A computer program product comprising a computer program according to embodiment xiv and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A sensor device that, when installed, determines whether a nearby barrier is open or closed, the sensor device comprising:
   an environment sensor configured to detect a presence of an object in a vicinity of the sensor device;
   a processor;
   a light sensor configured to receive a light signal to alter a functional state of the sensor device;
   a light source;
   a wireless communication module; and
   a memory;
   wherein when the light sensor receives the light signal, the sensor device is configured to transition from a first functional state, in which wireless communication is inactivated, to a second functional state, in which the wireless communication module is enabled; and
   wherein the memory stores instructions that, when executed by the processor, cause the sensor device to modulate light from the light source to transmit an identifier of the sensor device.

2. The sensor device according to claim 1, wherein the light signal is a predetermined sequence of light pulses.

3. The sensor device according to claim 1, wherein the memory stores instructions that, when executed by the processor, cause the sensor device to, when in the second functional state, receive configuration commands via the wireless communication module.

4. The sensor device according to claim 1, wherein the memory stores instructions that, when executed by the processor, cause the sensor device to provide feedback on functional state transition using the light source.

5. The sensor device according to claim 4, wherein the memory stores instructions that, when executed by the processor, cause the sensor device to modulate light from the light source to thereby enable the transmission of different messages.

6. The sensor device according to claim 1, wherein the sensor device comprises a housing that completely encloses the sensor device.

7. The sensor device according to claim 1, wherein the first functional state is a transportation state and the second functional state is a configuration state.

8. The sensor device according to claim 1, wherein the environment sensor is a proximity sensor.

9. A method for transitioning between functional states of a sensor device that, when installed, determines whether a nearby barrier is open or closed, the method being performed in the sensor device, comprising an environment sensor configured to detect a presence of an object in a vicinity of the sensor device, a light sensor configured to receive a light signal to alter the functional state of the sensor device, a light source and a wireless communication module, the method comprising:
   receiving the light signal;
   performing, based on receiving the light signal, a transition from a first functional state, in which wireless communication is inactivated, to a second functional state, in which the wireless communication module is enabled; and
   modulating light from the light source to transmit an identifier of the sensor device.

10. The method according to claim 9, wherein the light signal is a predetermined sequence of light pulses.

11. The method according to claim 9, further comprising receiving, when in the second functional state, configuration commands via the wireless communication module.

12. The method according to claim 9, further comprising:
    providing feedback on functional state transition using a light source forming part of the sensor device.

13. A non-transitory machine-readable storage medium comprising instructions stored thereon and executable by a microprocessor for transitioning between functional states of a sensor device that, when installed, determines whether a nearby barrier is open or closed, when run on the sensor device, comprising an environment sensor configured to detect a presence of an object in a vicinity of the sensor device, a light sensor configured to receive a light signal to alter the functional state of the sensor device, a light source and a wireless communication module causes the sensor device to:
    receive the light signal;
    perform, based on receiving the light signal, a transition from a first functional state, in which wireless communication is inactivated, to a second functional state, in which the wireless communication module is enabled; and
    modulate light from the light source to transmit an identifier of the sensor device.

* * * * *